(12) United States Patent  (10) Patent No.: US 7,690,202 B2
Badeer et al.  (45) Date of Patent:  Apr. 6, 2010

(54) MOBILE GAS TURBINE ENGINE AND GENERATOR ASSEMBLY

(75) Inventors: Gilbert Henry Badeer, Loveland, OH (US); Narendra Digamber Joshi, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 720 days.

(21) Appl. No.: 11/130,356

(22) Filed: May 16, 2005

(65) Prior Publication Data

US 2006/0254281 A1  Nov. 16, 2006

(51) Int. Cl.
*F02C 1/00*  (2006.01)
*F02C 6/04*  (2006.01)
(52) U.S. Cl. .......................................... 60/728; 60/784
(58) Field of Classification Search .................... 60/772, 60/728, 801, 784, 783; 290/52, 1 A, 2, 40 R, 290/40 B, 40 C; 440/6, 88 HE
See application file for complete search history.

(56) References Cited

U.S. PATENT DOCUMENTS

| | | | |
|---|---|---|---|
| 4,067,663 A * | 1/1978 | Brooks et al. | 417/199.2 |
| 4,896,499 A * | 1/1990 | Rice | 60/792 |
| 5,517,822 A | 5/1996 | Haws et al. | |
| 6,250,080 B1 | 6/2001 | Shelor et al. | |
| 6,283,100 B1 * | 9/2001 | Chen et al. | 123/563 |
| 6,329,725 B1 | 12/2001 | Woodall et al. | |
| 6,367,258 B1 * | 4/2002 | Wen et al. | 60/641.7 |
| 6,765,304 B2 | 7/2004 | Baten et al. | |
| 7,121,078 B2 * | 10/2006 | Turco et al. | 60/224 |
| 2005/0172880 A1 * | 8/2005 | Laurilehto et al. | 114/260 |

\* cited by examiner

*Primary Examiner*—Michael Cuff
*Assistant Examiner*—Gerald L Sung
(74) *Attorney, Agent, or Firm*—William Scott Andes, Esq.; Armstrong Teasdale LLP

(57) ABSTRACT

A method for supplying power to a remote load includes coupling a gas turbine engine to a vessel that is not used to provide propulsion for the vessel, coupling a generator to the gas turbine engine, coupling an intercooler system downstream from a first compressor such that compressed air discharged from the first compressor is channeled therethrough, the intercooler system includes an intercooler and a first heat exchanger, channeling a first working fluid through the intercooler to facilitate reducing an operating temperature of air discharged from the intercooler to a second compressor, channeling a second working fluid flowing through the first heat exchanger to extract energy from the first working fluid to facilitate reducing an operating temperature of the first working fluid, and operating the gas turbine engine and generator to supply power to a load that is located remotely from the vessel.

16 Claims, 2 Drawing Sheets

MOBILE GAS TURBINE ENGINE AND GENERATOR ASSEMBLY

BACKGROUND OF THE INVENTION

This invention relates generally to gas turbine engine and, more particularly to, a portable gas turbine engine generator set.

Gas turbine engines generally include, in serial flow arrangement, a high-pressure compressor for compressing air flowing through the engine, a combustor in which fuel is mixed with the compressed air and ignited to form a high temperature gas stream, and a high pressure turbine. The high-pressure compressor, combustor and high-pressure turbine are sometimes collectively referred to as the core engine. Such gas turbine engines also may include a low-pressure compressor, or booster, for supplying compressed air to the high pressure compressor.

Gas turbine engines are used in many applications, including in aircraft, power generation, and marine applications. The desired engine operating characteristics vary, of course, from application to application. Accordingly, at least one known gas turbine includes a booster compressor to facilitate increasing the pressure of the air entering the high pressure compressor, which results in increased power output and efficiency of the gas turbine engine. An intercooler heat exchanger may be positioned between the booster compressor and the high pressure compressor to facilitate reducing the temperature of the air entering the high pressure compressor. Using an intercooler facilitates increasing the efficiency of the engine while reducing the quantity of work performed by the high pressure compressor.

Moreover, at least one known gas turbine generator assembly includes a gas turbine engine that is coupled to a generator, wherein the gas turbine generator assembly is then coupled to a barge to facilitate delivering power to remote areas of the world. However, the at least one known gas turbine generator assembly includes an intercooler heat exchanger that utilizes ambient air as a cooling medium to cool the air flow exiting the booster compressor. Accordingly, the reduction in temperature is limited by the dry bulb ambient air temperature for the air cooled heat exchanger. Moreover, air-to-air heat exchangers are generally less effective when used on hot days due to a lower air density and an increase in the intercooler exit temperatures, thus resulting in a decrease in the gas turbine power.

BRIEF DESCRIPTION OF THE INVENTION

In one aspect, a method for supplying power to a remote load is provided. The method includes coupling a gas turbine engine to a vessel that is not used to provide propulsion for the vessel, coupling a generator to the gas turbine engine, coupling an intercooler system downstream from a first compressor such that compressed air discharged from the first compressor is channeled therethrough, the intercooler system includes an intercooler and a first heat exchanger, channeling a first working fluid through the intercooler to facilitate reducing an operating temperature of air discharged from the intercooler to a second compressor, channeling a second working fluid flowing through the first heat exchanger to extract energy from the first working fluid to facilitate reducing an operating temperature of the first working fluid, and operating the gas turbine engine and generator to supply power to a load that is located remotely from the vessel.

In another aspect, a gas turbine generator assembly that is configured to operate in a marine environment is provided. The gas turbine generator assembly includes a gas turbine engine including a first compressor, a second compressor downstream from the first compressor, and a turbine coupled in flow communication with the second compressor, the gas turbine engine coupled to a vessel, wherein the gas turbine is not used to provide propulsion for the vessel, a generator coupled to the gas turbine engine, and an intercooler system including an intercooler and a first heat exchanger, the intercooler coupled downstream from the first compressor such that compressed air discharged from the first compressor is channeled therethrough, the intercooler operable with a first working fluid flowing therethrough that facilitates reducing an operating temperature of air discharged from the intercooler to the second compressor, the first heat exchanger operable with a second working fluid flowing therethrough, the first heat exchanger configured to extract energy from the first working fluid to facilitate reducing an operating temperature of the first working fluid.

In a further aspect, a vessel that is configured to operate within a marine environment is provided. The vessel includes a first gas turbine engine including a first compressor, a second compressor downstream from the first compressor, and a turbine coupled in flow communication with the second compressor, the first gas turbine engine coupled to the vessel, wherein the first gas turbine is not used to provide propulsion for the vessel, a second gas turbine engine including a first compressor, a second compressor downstream from the first compressor, and a turbine coupled in flow communication with the second compressor, the second gas turbine engine coupled to the vessel, wherein the gas turbine is not used to provide propulsion for the vessel, a first generator coupled to the first gas turbine engine, a second generator coupled to the second gas turbine engine, and an intercooler system including an intercooler and a first heat exchanger, the intercooler coupled downstream from the first gas turbine first compressor and the second gas turbine first compressor such that compressed air discharged from the first gas turbine first compressor and the second gas turbine first compressor is channeled therethrough, the intercooler operable with a first working fluid flowing therethrough that facilitates reducing an operating temperature of air discharged from the intercooler to the first gas turbine second compressor and the second gas turbine second compressor, the first heat exchanger operable with a second working fluid flowing therethrough, the first heat exchanger configured to extract energy from the first working fluid to facilitate reducing an operating temperature of the first working fluid.

DETAILED DESCRIPTION OF THE INVENTION

Figure 1:
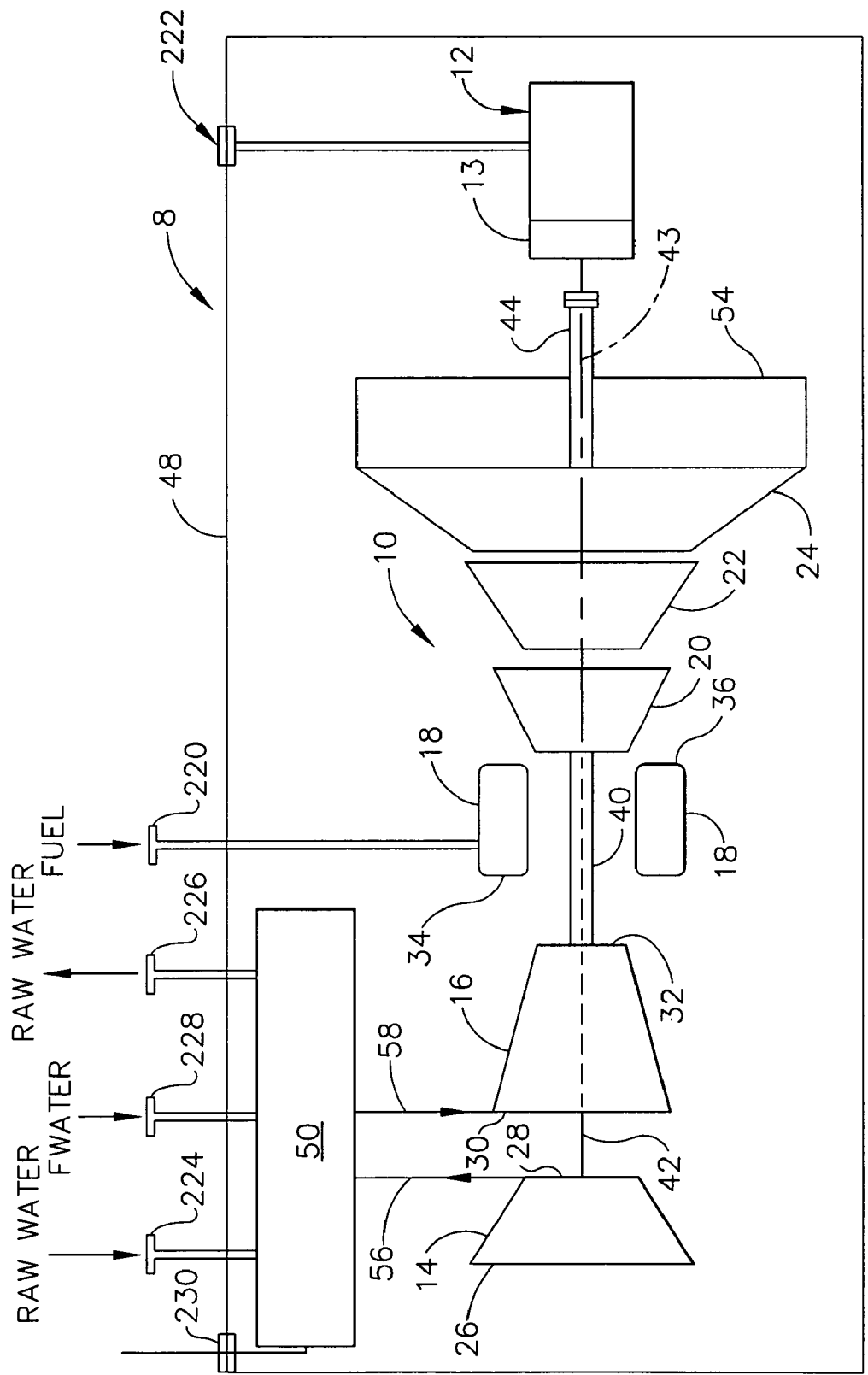
FIG. 1 is a schematic illustration of an exemplary mobile gas turbine engine and generator assembly.

FIG. 1 is a block diagram of a mobile generator assembly 8 that includes an exemplary gas turbine engine 10 in an installation wherein engine 10 is used to power a load such as an electric generator which is generally represented at 12. Generator 12 may be driven through a gearbox section 13. Hereinafter, references to generator 12 shall be understood to also include gearbox section 13. Gas turbine engine 10 includes, in serial flow relationship, a low pressure compressor or booster 14, a high pressure compressor 16, a combustor 18, a high pressure turbine 20, a low pressure, or intermediate, turbine 22, and a power turbine 24. In one embodiment, combustor 18 is a standard annular can (SAC) combustor that is operable utilizing a water configuration with nitrogen oxides (NOx) abatement. In another embodiment, combustor 18 is a dry low emission (DLE) combustor.

Low pressure compressor or booster 14 has an inlet 26 and an outlet 28. High pressure compressor 16 has an inlet 30 and an outlet 32. Combustor 18 has an inlet 34 that is substantially coincident with high pressure compressor outlet 32, and an outlet 36. High pressure turbine 20 is coupled to high pressure compressor 16 with a first rotor shaft 40, and low pressure turbine 22 is coupled to low pressure compressor 14 with a second rotor shaft 42. Rotor shaft 42 is coaxially positioned within first rotor shaft 40 about a longitudinal centerline axis 43 of engine 10. In one embodiment, gas turbine engine 10 is an LMS100 gas turbine engine that is commercially available from General Electric Company, Cincinnati, Ohio. Although mobile generator assembly 8 is described herein including a single gas turbine generator 10 and generator 12, it should be realized that mobile generator assembly 8 may include two or more gas turbine engines and respective generators without narrowing the scope of the invention described herein.

During operation, outside air is drawn into inlet 26 of low pressure compressor 14, wherein the air is compressed and supplied from low pressure compressor 14 to high pressure compressor 16. High pressure compressor 16 compresses the air additionally and delivers high pressure air to combustor 18 wherein it is mixed with fuel and ignited to generate high temperature combustion gases. The combustion gases are channeled from combustor 18 to drive turbines 20, 22, and 24.

While the invention will be described in terms of an electrical generator driven by a gas turbine engine, it should be understood that the following description is only for illustrative purposes and is but one potential application of the inventive concepts herein. It is appreciated that the benefits and advantages of the invention may accrue equally to other types of gas turbine engines that may utilized to power a generator, such as generator 12.

In the exemplary embodiment, power turbine 24 and generator 12 are both coupled to third rotor shaft 44. Gas turbine 10 is used to drive a load (not shown) which is located aft of gas turbine engine 10 and is driven coupled to a power turbine shaft 44.

The power output of engine 10 is at least partially related to the temperatures of the gas flow at various locations along the gas flow path. More specifically, a temperature of the gas flow at high-pressure compressor outlet 32, and a temperature of the gas flow at combustor outlet 36 are closely monitored during the operation of engine 10. Lowering the temperature of the gas flow entering high pressure compressor 16 generally results in increasing the power output of engine 10.

To facilitate lowering the temperature of the gas flow entering high pressure compressor 16, gas turbine engine 10 includes an intercooler system 50 that is coupled in flow communication with low pressure compressor 14 and high pressure compressor 16. In operation, airflow from low pressure compressor 14 is channeled to intercooler system 50 for additional cooling prior to the cooled air being channeled to high-pressure compressor 16.

In the exemplary embodiment, mobile generator assembly 8 is coupled to a towed vessel 48, wherein towed vessel as used here, is defined as a vessel that is not configured for self-propulsion. In an alternative embodiment, mobile generator assembly 8 is coupled to a powered vessel, wherein powered vessel as used here, is defined a vessel that is configured for self-propulsion. Accordingly, in the alternative embodiment, mobile generator assembly 8 is coupled to a skid (not shown) that includes a plurality of lift fixtures (not shown) such that a crane or other lifting device can be used to couple mobile generator assembly 8 to the powered vessel.

Figure 2:
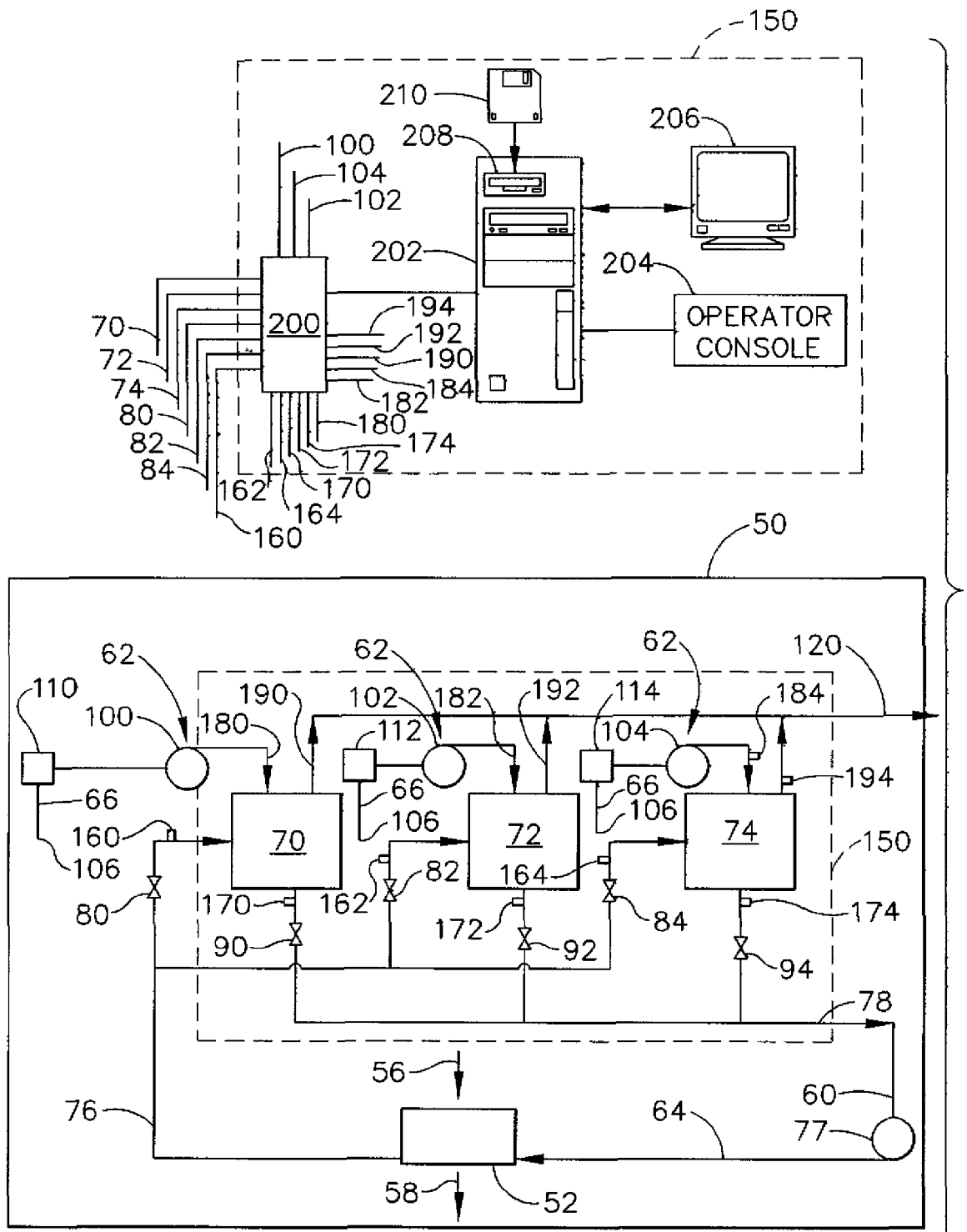
FIG. 2 is a schematic illustration of an exemplary intercooler system that may be used with the mobile gas turbine engine and generator assembly shown in FIG. 1.

FIG. 2 is a block diagram of exemplary intercooler system 50 shown in FIG. 1. To facilitate reducing the operating temperature of a gas flow entering high pressure compressor 16, intercooler system 50 includes an intercooler 52. In the exemplary embodiment, airflow 56 from low pressure compressor 14 is channeled through intercooler 52 for additional cooling prior to the cooled air 58 being returned to high-pressure compressor 16.

In the exemplary embodiment, intercooler system 50 also includes a first cooling system 60 and a second cooling system 62. In the exemplary embodiment, intercooler 52 is a water to air heat exchanger that has a first working fluid 64 flowing therethrough, second cooling system 62 has a second working fluid 66 flowing therethrough. In the exemplary embodiment, first cooling system 60 utilizes freshwater as first working fluid 64, and second cooling system 62 utilizes raw water as second working fluid 66. As used herein, raw water is defined as water that is channeled from the body of water in which towed vessel 48 is currently operating. For example, if towed vessel 48 is operating in a freshwater body of water, raw water is defined as freshwater that is channeled from the freshwater body to intercooler system 50. Alternatively, if towed vessel 48 is operating in a saltwater body of water, raw water is defined as saltwater that is channeled from the saltwater body to intercooler system 50.

First cooling system 60 includes intercooler 52, a first heat exchanger 70, a second heat exchanger 72, a third heat exchanger 74, and a supply manifold 76 that is coupled between intercooler 52, and heat exchangers 70, 72, and 74, respectively. More specifically, supply manifold 76 is configured to channel first working fluid 64 from intercooler 52 to each respective heat exchanger 70, 72, and 74.

First cooling system 60 also includes a pump 77 that is configured to channel first working fluid 64 through intercooler 52, through supply manifold 76, through each respective heat exchanger 70, 72, and 74, through a discharge manifold 78, and back to pump 77. In the exemplary embodiment, first cooling system 60 operates in a substantially closed loop configuration and includes a tank or reservoir (not shown) to facilitate adding additional working fluid 64 to first cooling system 60 as desired. In the exemplary embodiment, each heat exchanger 70, 72, and 74 includes an inlet valve 80, 82, and 84 to facilitate isolating each heat exchanger 70, 72, and 74 from supply manifold 76. Each heat exchanger 70, 72, and 74 also includes an outlet valve 90, 92, and 94 to facilitate isolating each heat exchanger 70, 72, and 74 from discharge manifold 78. Accordingly, and in the exemplary embodiment, each respective heat exchanger 70, 72, and 74 can be operated individually. More specifically, each respective heat exchanger 70, 72, and 74 can be isolated from supply manifold 76 and discharge manifold 78 utilizing inlet valves 80, 82, and 84, and outlet valves 90, 92, and 94, respectively.

Second cooling system 62 includes first heat exchanger 70, second heat exchanger 72, and third heat exchanger 74. Second cooling system 62 also includes at least a first pump 100, a second pump 102, and a third pump 104. In the exemplary embodiment, first pump 100 is configured to channel second working fluid 66 from a source 106 through a strainer 110 and first heat exchanger 70. Second working fluid is then discharged from heat exchanger 70 utilizing a discharge manifold 120. In the exemplary embodiment, second pump 102 is configured to channel second working fluid 66 from source 106 through a strainer 112 and into second heat exchanger 72.

Second working fluid 66 is then discharged from second heat exchanger 72 utilizing discharge manifold 120. In the exemplary embodiment, third pump 104 is configured to channel second working fluid 66 from source 106 through a strainer 114 and into third heat exchanger 74. Second working fluid 66 is then discharged from third heat exchanger 74 utilizing discharge manifold 120. In an alternative embodiment, second cooling system 62 includes a single supply manifold and strainer (not shown), such that second working fluid 66 is channeled from source 106 though a single manifold and strainer to each respective pump 100, 102, and 104. In the exemplary embodiment, intercooler system 50 is a modular unit that is coupled to barge 48.

Mobile generator assembly 8 also includes a control system 150 that is configured to control the operation of at least one of gas turbine engine 10 and/or intercooler system 50. More specifically, and in the exemplary embodiment, control system 150 is coupled to gas turbine engine 10 and receives a plurality of operational signals from gas turbine engine 10 to enable an operator to monitor gas turbine engine 10 performance and/or to operate gas turbine engine 10 from either a local or remote location. Moreover, control system 150 is coupled to intercooler system 50 and receives a plurality of operational signals from intercooler system 50 to enable an operator to monitor intercooler system 50 performance and/or to operate intercooler system 50 from either a local or remote location In the exemplary embodiment, first cooling system 60 includes at least a first temperature sensor 160, 162, and 164 that are each coupled to a respective inlet of each heat exchanger 70, 72, and 74, and a second temperature sensor 170, 172, and 174 that are each coupled to a respective outlet of each heat exchanger 70, 72, and 74. In the exemplary embodiment, a signal from temperature sensors 160, 162, 164, 170, 172, and 174 are transmitted to control system 150 to facilitate determining a temperature drop, within first cooling system 60, across each respective heat exchanger 70, 72, and 74.

In the exemplary embodiment, second cooling system 62 includes at least a first flow sensor 180, 182, and 184 that are coupled to a respective inlet of each heat exchanger 70, 72, and 74, and a second flow sensor 190, 192, and 194 that are coupled to a respective outlet of each heat exchanger 70, 72, and 74. In the exemplary embodiment, a signal from flow sensors 180, 182, 184, 190, 192, and 194 are transmitted to control system 150 to facilitate determining a pressure drop, within second cooling system 62, across each respective heat exchanger 70, 72, and 74.

In the exemplary embodiment, control system 150 is also electrically coupled to pump 77, inlet valves 80, 82, 84, and outlet valves 90, 92, and 94, respectively. More specifically, control system 150 is configured to energize/de-energize pump 77, and to open/close valves 80, 82, 84, 90, 92, and 94 based on inputs received from at least one of gas turbine engine 10, intercooler system 50, and/or an operator input.

In the exemplary embodiment, a control interface section 200 samples analog data received from at least one of gas turbine engine 10 and/or intercooler system 50 and converts the analog data to digital signals for subsequent processing. A computer 202 receives the sampled and digitized sensor data from control interface section 200 and performs high-speed data analysis.

Computer 202 receives commands from an operator via a keyboard 204. An associated monitor 206 such as, but not limited to, a liquid crystal display (LCD) and/or a cathode ray tube, allows the operator to observe data received from computer 202. The operator supplied commands and parameters are used by computer 202 to provide control signals and information to control interface section 200.

In one embodiment, computer 202 includes a device 208, for example, a floppy disk drive, CD-ROM drive, DVD drive, magnetic optical disk (MOD) device, and/or any other digital device including a network connecting device such as an Ethernet device for reading instructions and/or data from a computer-readable medium 210, such as a floppy disk, a CD-ROM, a DVD or an other digital source such as a network or the Internet, as well as yet to be developed digital means. In another embodiment, computer 202 executes instructions stored in firmware (not shown). Computer 202 is programmed to perform the functions described herein, and as used herein, the term computer is not limited to just those integrated circuits generally known as computers, but broadly refers to computers, processors, microcontrollers, microcomputers, programmable logic controllers, application specific integrated circuits, and other programmable circuits, and these terms are used interchangeably herein.

In the exemplary embodiment, mobile generator assembly 8 is coupled to towed vessel 48 and coupled to a plurality of hotel services. More specifically, mobile generator assembly 8 includes a connection 220 to couple to an external fuel source, such as, but not limited to at least one of a gaseous fuel and a liquid fuel to facilitate supplying fuel to gas turbine engine 10. Mobile generator assembly 8 also includes at least one circuit breaker 222 to facilitate coupling generator 12 to an external load that is positioned remotely from mobile generator assembly 8. In the exemplary embodiment, mobile generator assembly 8 includes at least one opening (not shown) for supplying second working fluid 66 to intercooler system 50, and a second opening (not shown) for discharging second working fluid 66 overboard. In an alternative embodiment, mobile generator assembly 8 includes at least one connection 224 for supplying second working fluid 66 to intercooler system 50 from a remote source, and a second connection 226 for discharging second working fluid 66 overboard to the remote source. Mobile generator assembly 8 also includes at least one connection 228 for supplying first working fluid 66 to intercooler system 50. In the exemplary embodiment, mobile generator assembly 8 also includes a connection 230 for electrically coupling control system 150 to a remote computer. More specifically, in the exemplary embodiment, mobile generator assembly 8 including gas turbine engine 10 and intercooler system 50 are controlled onboard towed vessel 48 utilizing control system 150. In an alternative embodiment, mobile generator assembly 8 including gas turbine engine 10 and intercooler system 50 are controlled from a remote location utilizing a remote computer that is coupled to connection 230 to facilitate controlling control system 150.

During operation, vessel 48 is towed to a desired location. In the exemplary embodiment, vessel 48 includes a fuel storage tank (not shown), and a fresh water storage tank (not shown) such that mobile generator assembly 8 can be operated without shore services. In an alternative embodiment, vessel 48 is connected to shore services. Specifically, a seawater source is coupled to connection 224, a seawater discharge is coupled to connection 226, a freshwater source is coupled to connection 228, a fuel source is coupled to connection 220, and a remote load is coupled to circuit breaker 222, and a remote computer is coupled to connection 230.

In the exemplary embodiment, an operate inputs a command to control system 150 to align at least two of heat exchangers 70, 72, and 74 for operation. More specifically, control system 150 outputs a command signal to valves 80, 82, 84, 90, 92, and 94 to either open or close the valves such that at least two of the respective heat exchangers 70, 72, and/or 74 are aligned for operation. Control system 150 then outputs a command signal to energize at least two of pumps 100, 102, and/or 104 such that second working fluid 66 is channeled through the two respective heat exchangers 70, 72, and/or 74. Additionally, control system 150 outputs a command signal to pump 77 such that first working fluid 64 is channeled through intercooler 52. Gas turbine engine 10 is then started such that electrical power is supplied from generator 12, through circuit breaker 222, to a remote load.

While intercooler system 50 is operating, control system 150 receives a signal representative of a temperature drop across each of the first, second, and third heat exchangers 70, 72, and 74. Control system 150 also receives a signal representative of a second working fluid (66) flow rate through the first, second, and third heat exchangers 70, 72, and 74. In the exemplary embodiment, control system 150 compares the received temperature and flow rate signals to a predetermined value. If at least one of the received temperature and/or flow rate signal exceeds the predetermined value, control system 150 automatically aligns the non-operating heat exchanger system for operation by opening the respective inlet and outlet valves and energizing the respective pump. More specifically, in the exemplary embodiment, control system 150 is configured to automatically operate at least two of heat exchangers 70, 72, and/or 74 and their respective pumps 100, 102 and/or 104 for normal operation, while the third heat exchanger and associates pump is maintained in a "standby" mode. In an alternative embodiment, control system 150 compares the received temperature and flow rate signals to a predetermined value. If at least one of the received temperature and/or flow rate signal exceeds the predetermined value, control system 150 generates at least one of an audio or visual indication to alert an operator. The operator may then manually align the non-operating heat exchanger system for operation by opening the respective inlet and outlet valves and energizing the respective pump and then securing or isolating the effected heat exchanger by closing the respective valves and stopping the respective pump.

The above-described mobile generator assembly includes at least two gas turbine engines that are coupled to two respective generators that are configured to provide electrical power to a remote load. The mobile generator assembly also includes at least three heat exchangers and associated pumps and piping. A control system is programmed to operate at least two of the heat exchangers and associated pumps during normal operation. When an indication is received of an abnormal condition, the control system is programmed to align the standby heat exchanger and start the respective standby pump. The control system will then isolate the affected heat exchanger and stop the respective pump.

Although only a single mobile generator assembly is described herein, it should be realized that a plurality of mobile generator assemblies can be electrically coupled together to generate an increased power output to a remote load. For example, and in the exemplary embodiment, a single mobile generator assembly may generate approximately 200 megawatts (MW) of power, whereas two mobile generator assemblies electrically coupled in parallel may generate approximately 400 MW. Moreover, the mobile generator assemblies are capable of generating power in a relatively short time after the assembly is coupled to the shore load. The mobile generator assembly described herein therefore facilitates providing an efficient system that can provide power to remote locations when desired. Moreover, in the exemplary embodiment, the intercooler system utilizes seawater that is channeled from the surrounding environment to facilitate optimizing the performance of the gas turbine engines.

Exemplary embodiments of a mobile generator system are described above in detail. The mobile generator system is not limited to the specific embodiments described herein, but rather, components of the system may be utilized independently and separately from other components described herein. Specifically, the mobile generator system may include 1, 2 or more gas turbine engines. Further the intercooler system may include any quantity of heat exchangers and associated pumps.

While the invention has been described in terms of various specific embodiments, those skilled in the art will recognize that the invention can be practiced with modification within the spirit and scope of the claims.

What is claimed is:

1. A method for supplying power to a remote load, said method comprising:
   coupling a gas turbine engine to a mobile vessel that is operable within a marine environment, wherein the gas turbine engine is not used to provide propulsion for the mobile vessel, wherein the gas turbine includes a first compressor, a second compressor downstream from the first compressor, and a turbine coupled in flow communication with the second compressor;
   coupling a generator to the gas turbine engine;
   coupling an intercooler system downstream from the first compressor such that compressed air discharged from the first compressor is channeled therethrough, the intercooler system includes an intercooler, a first heat exchanger, a first pump, a second pump, a third pump, and a control system that is configured to control the operation of the first, second, and third pumps;
   operating the intercooler system using the control system such that only two of the first, second, and third pumps are operable at any time during normal operation;
   channeling a first working fluid through the intercooler to facilitate reducing an operating temperature of air discharged from the intercooler to the second compressor;
   channeling a second working fluid flowing through the first heat exchanger to extract energy from the first working fluid to facilitate reducing an operating temperature of the first working fluid; and
   operating the gas turbine engine and generator to supply power to the load that is located remotely from the mobile vessel.

2. A method in accordance with claim 1 wherein channeling a second working fluid flowing through the first non-condensing heat exchanger further comprises channeling water through the first heat exchanger to extract energy from the first working fluid.

3. A method in accordance with claim 1 wherein channeling a second working fluid flowing through the first heat exchanger further comprises channeling at least one of saltwater and freshwater through the first heat exchanger to facilitate reducing an operating temperature of the first working fluid.

4. A method in accordance with claim 1 wherein the intercooler system further includes a control system that is configured to receive a signal representative of a temperature drop across each of the first, second, and third heat exchangers, said method further comprising controlling the operation of the first, second, and third heat exchangers based on the received temperature signal.

5. A method in accordance with claim 1 wherein the intercooler system further includes a control system that is configured to receive a signal representative of a flow rate across each of the first, second, and third heat exchangers, said method further comprising controlling the operation of the first, second, and third heat exchangers based on the received flow rate signal.

6. A gas turbine generator assembly that is operable within a marine environment comprising:
   a gas turbine engine comprising a first compressor, a second compressor downstream from said first compressor, and a turbine coupled in flow communication with said second compressor, said gas turbine engine coupled to a mobile vessel that is operable within the marine environment, wherein said gas turbine is not used to provide propulsion for the mobile vessel;
   a generator coupled to said gas turbine engine, said gas turbine engine and said generator configured to supply power to a load that is located remote from the mobile vessel;
   an intercooler system comprising an intercooler, a first heat exchanger, a first pump operably coupled to said first heat exchanger, a second pump operably coupled to a second heat exchanger, and a third pump operably coupled to a third heat exchanger, said first, second, and third pumps are each configured to channel the second working fluid to a respective one of said first, second, and third heat exchangers, said intercooler coupled downstream from said first compressor such that compressed air discharged from said first compressor is channeled therethrough, said intercooler operable with a first working fluid flowing therethrough that facilitates reducing an operating temperature of air discharged from said intercooler to said second compressor, said first heat exchanger operable with a second working fluid flowing therethrough, said first heat exchanger configured to extract energy from the first working fluid to facilitate reducing an operating temperature of the first working fluid; and
   a control system configured to control operation of said first, second, and third pumps such that only two of said first, second, and third pumps are operable at any time during normal operation.

7. A gas turbine generator assembly in accordance with claim 6 wherein the second working fluid is freshwater.

8. A gas turbine generator assembly in accordance with claim 6 wherein the second working fluid is saltwater.

9. A gas turbine generator assembly in accordance with claim 6 further comprising:
   a first strainer operably coupled to an inlet of said first pump;
   a second strainer operably coupled to an inlet of said second pump; and
   a third strainer operably coupled to an inlet of said third pump.

10. A gas turbine generator assembly in accordance with claim 6 wherein said control system is further configured to:
   receive a signal representative of a temperature drop across each of said first, second, and third heat exchangers; and
   control the operation of said first, second, and third heat exchangers based on the received temperature signal.

11. A gas turbine generator assembly in accordance with claim 6 wherein said control system is further configured to:
   receive a signal representative of a second working fluid flow rate through said first, second, and third heat exchangers; and
   control the operation of said first, second, and third heat exchangers based on the received fluid flow rate signal.

12. A mobile vessel that is operable within a marine environment comprising:
   a first gas turbine engine comprising a first compressor, a second compressor downstream from said first compressor, and a turbine coupled in flow communication with said second compressor, said first gas turbine engine coupled to said mobile vessel, wherein said first gas turbine is not used to provide propulsion for said mobile vessel;
   a second gas turbine engine comprising a first compressor, a second compressor downstream from said first compressor, and a turbine coupled in flow communication with said second compressor, said second gas turbine engine coupled to said mobile vessel;
   a first generator coupled to said first gas turbine engine, said first gas turbine engine and said first generator configured to supply power to a load that is located remote from the mobile vessel;
   a second generator coupled to said second gas turbine engine; and
   an intercooler system comprising an intercooler, a first heat exchanger a first pump operably coupled to said first heat exchanger, a second pump operably coupled to a second heat exchanger, and a third pump operably coupled to a third heat exchanger, said first, second, and third pumps are each configured to channel the second working fluid to a respective one of said first, second, and third heat exchangers, said intercooler coupled downstream from said first gas turbine first compressor and said second gas turbine first compressor such that compressed air discharged from said first gas turbine first compressor and said second gas turbine first compressor is channeled therethrough, said intercooler operable with a first working fluid flowing therethrough that facilitates reducing an operating temperature of air discharged from said intercooler to said first gas turbine second compressor and said second gas turbine second compressor, said first heat exchanger operable with a second working fluid flowing therethrough, said first heat exchanger configured to extract energy from the first working fluid to facilitate reducing an operating temperature of the first working fluid; and
   a control system configured to control operation of said first, second, and third pumps such that only two of said first, second, and third pumps are operable at any time during normal operation.

13. A mobile vessel in accordance with claim 12 wherein said second working fluid is raw water.

14. A mobile vessel in accordance with claim 12 wherein the second working fluid is at least one of saltwater and freshwater.

15. A mobile vessel in accordance with claim 12 wherein said intercooler system further comprises:
   a first strainer operably coupled to an inlet of said first pump; and
   a second strainer operably coupled to an inlet of said second pump;
   a third strainer operably coupled to an inlet of said third pump.

16. A mobile vessel in accordance with claim 15 wherein said control system is further configured to:

receive a signal representative of a temperature drop across each of said first, second, and third heat exchangers;
receive a signal representative of a second working fluid flow rate through said first, second, and third heat exchangers; and control the operation of said first, second, and third heat exchangers based on the received temperature and flow rate signals.

* * * * *